United States Patent
Jivan et al.

(10) Patent No.: US 11,657,388 B2
(45) Date of Patent: *May 23, 2023

(54) MULTI-CURRENCY CART AND CHECKOUT

(71) Applicant: eBay Inc., San Jose, CA (US)

(72) Inventors: Malathi Jivan, San Jose, CA (US); Mica Merce, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,870

(22) Filed: Nov. 23, 2021

(65) Prior Publication Data

US 2022/0084016 A1    Mar. 17, 2022

Related U.S. Application Data

(63) Continuation of application No. 16/826,702, filed on Mar. 23, 2020, now Pat. No. 11,200,567, which is a
(Continued)

(51) Int. Cl.
*G06Q 20/38* (2012.01)
*G06Q 30/0601* (2023.01)
*G06Q 20/10* (2012.01)

(52) U.S. Cl.
CPC ......... *G06Q 20/381* (2013.01); *G06Q 20/102* (2013.01); *G06Q 30/0633* (2013.01)

(58) Field of Classification Search
CPC . G06Q 20/381; G06Q 20/102; G06Q 30/0633
See application file for complete search history.

(56) References Cited

U.S. PATENT DOCUMENTS

| 8,275,672 B1 | 9/2012 | Nguyen et al. |
| 9,911,119 B2 | 3/2018 | Jivan et al. |

(Continued)

OTHER PUBLICATIONS

Add to Cart for Simpler, Faster Shopping, Retrieved from the Internet URL: <https://web.archive.org/web/20110319115633/http://pages.ebay.com/shoppingcart/>, Accessed on Sep. 2, 2016, 6 pages.
(Continued)

*Primary Examiner* — Sonji N Johnson
(74) *Attorney, Agent, or Firm* — Schwegman Lundberg & Woessner, P.A.

(57) ABSTRACT

Example embodiments provide a multi-currency cart and checkout. In example embodiments, a currency accepted and a payment option for each item in a multi-currency cart is identified. A plurality of currency groups is generated based on the currency and payment options, whereby each currency group comprises one or more items having a same payment option and accepting a same currency. A multi-currency checkout user interface (UI) is presented on a client device that presents the plurality of currency groups and a pay selector for each of the plurality of the currency groups. An updated multi-currency checkout UI is presented in response to processing payment for a selected one of the plurality of currency groups. The updated multi-currency UI comprises a confirmation for payment for the selected one of the plurality of currency groups and remaining currency groups of the plurality of currency groups.

20 Claims, 14 Drawing Sheets

Related U.S. Application Data continuation of application No. 16/294,683, filed on Mar. 6, 2019, now Pat. No. 10,643,201, which is a continuation of application No. 15/881,565, filed on Jan. 26, 2018, now Pat. No. 10,255,599, which is a continuation of application No. 14/631,281, filed on Feb. 25, 2015, now Pat. No. 9,911,119.

(56) References Cited

U.S. PATENT DOCUMENTS

| | | | |
|---|---|---|---|
| 10,255,599 B2* | 4/2019 | Jivan | G06Q 20/102 |
| 10,643,201 B2* | 5/2020 | Jivan | G06Q 30/0633 |
| 11,004,047 B2* | 5/2021 | Guyot | G06Q 20/20 |
| 11,200,567 B2 | 12/2021 | Jivan et al. | |
| 2002/0174031 A1* | 11/2002 | Weiss | G06Q 20/04 |
| | | | 705/26.1 |
| 2008/0023540 A1 | 1/2008 | Rao et al. | |
| 2010/0082461 A1 | 4/2010 | Bacigalupi et al. | |
| 2012/0185355 A1 | 7/2012 | Kilroy | |
| 2013/0204746 A1 | 8/2013 | Lee et al. | |
| 2014/0222616 A1 | 8/2014 | Siemiatkowski et al. | |
| 2014/0372188 A1 | 12/2014 | Desideri et al. | |
| 2015/0046308 A1 | 2/2015 | Sharma | |
| 2016/0217512 A1 | 7/2016 | Majumdar et al. | |
| 2016/0247148 A1 | 8/2016 | Jivan et al. | |
| 2016/0267478 A1 | 9/2016 | Chow et al. | |
| 2018/0150834 A1 | 5/2018 | Jivan et al. | |
| 2019/0205868 A1 | 7/2019 | Jivan et al. | |
| 2020/0226590 A1 | 7/2020 | Jivan et al. | |

OTHER PUBLICATIONS

Display International Pricing The Right Way—Cleverbridge, Retreived from the Internet URL: <http://cleverbridge.com/corporate/displayinternational-pricing-the-right-way>, Accessed on Sep. 2, 2016, 12 pages.
Final Office Action received for U.S. Appl. No. 14/631,281, dated Oct. 3, 2016, 12 pages.
First Action Interview—Office Action Summary received for U.S. Appl. No. 14/631,281, dated Feb. 8, 2016, 5 pages.
First Action Interview—Pre-interview Communication received for U.S. Appl. No. 14/631,281, dated Sep. 30, 2015, 4 pages.
Notice of Allowance received for U.S. Appl. No. 14/631,281, dated Oct. 23, 2017, 10 pages.
Final Office Action received for U.S. Appl. No. 15/881,565, dated Sep. 7, 2018, 8 pages.
Non-Final Office Action received for U.S. Appl. No. 15/881,565, dated Apr. 13, 2018, 11 pages.
Notice of Allowance received for U.S. Appl. No. 15/881,565, dated Nov. 28, 2018, 9 pages.
Final Office Action received for U.S. Appl. No. 16/294,683, dated Oct. 11, 2019, 12 pages.
Non-Final Office Action received for U.S. Appl. No. 16/294,683, dated Apr. 19, 2019, 17 pages.
Notice of Allowance received for U.S. Appl. No. 16/294,683, dated Dec. 31, 2019, 9 pages.
Advisory Action received for U.S. Appl. No. 16/826,702, dated Feb. 10, 2021, 3 pages.
Final Office Action received for U.S. Appl. No. 16/826,702, dated Nov. 13, 2020, 18 pages.
Non Final Office Action received for U.S. Appl. No. 16/826,702, dated Apr. 15, 2021, 12 pages.
Non Final Office Action received for U.S. Appl. No. 16/826,702, dated May 14, 2020, 16 pages.
Notice of Allowance received for U.S. Appl. No. 16/826,702, dated Aug. 9, 2021, 10 pages.

* cited by examiner

MULTI-CURRENCY CART AND CHECKOUT

PRIORITY

This application is a continuation of and claims the benefit of priority to U.S. patent application Ser. No. 16/826,702, filed Mar. 23, 2020, which is a continuation of and claims the benefit of priority to U.S. patent application Ser. No. 16/294,683, filed Mar. 6, 2019 which is a continuation of U.S. patent application Ser. No. 15/881,565, filed Jan. 26, 2018, which is a continuation of and claims the benefit of priority to U.S. patent application Ser. No. 14/631,281, filed Feb. 25, 2015, each of which are hereby incorporated by reference herein in their entirety.

FIELD

The present disclosure relates generally to data processing and, in a specific example embodiment, to a system for managing a multiple currency cart and a corresponding checkout process.

BACKGROUND

Conventionally, it is impossible to perform a checkout process with items of different currency in a seamless operation. Typically, the user must place items of a first currency into a cart and perform a checkout process for the first currency. Subsequently, the user then has to place items of a second currency into a new cart and perform a second checkout process. Alternatively, the user may have placed the items of the first currency into the cart and place the items of the second currency into a "save for later" portion. Once the user performs the checkout process for the first currency, a message may be sent to the user that there are items left to still pay for that are in the second currency. The user then needs to place or move these items into their cart and perform a second checkout process. This multiple cart and multiple checkout process is further complicated by offline payment methods where a seller's bank account information may need to be provided.

BRIEF DESCRIPTION OF DRAWINGS

Various ones of the appended drawings merely illustrate example embodiments of the present invention and cannot be considered as limiting its scope.

DETAILED DESCRIPTION

Figure 1:
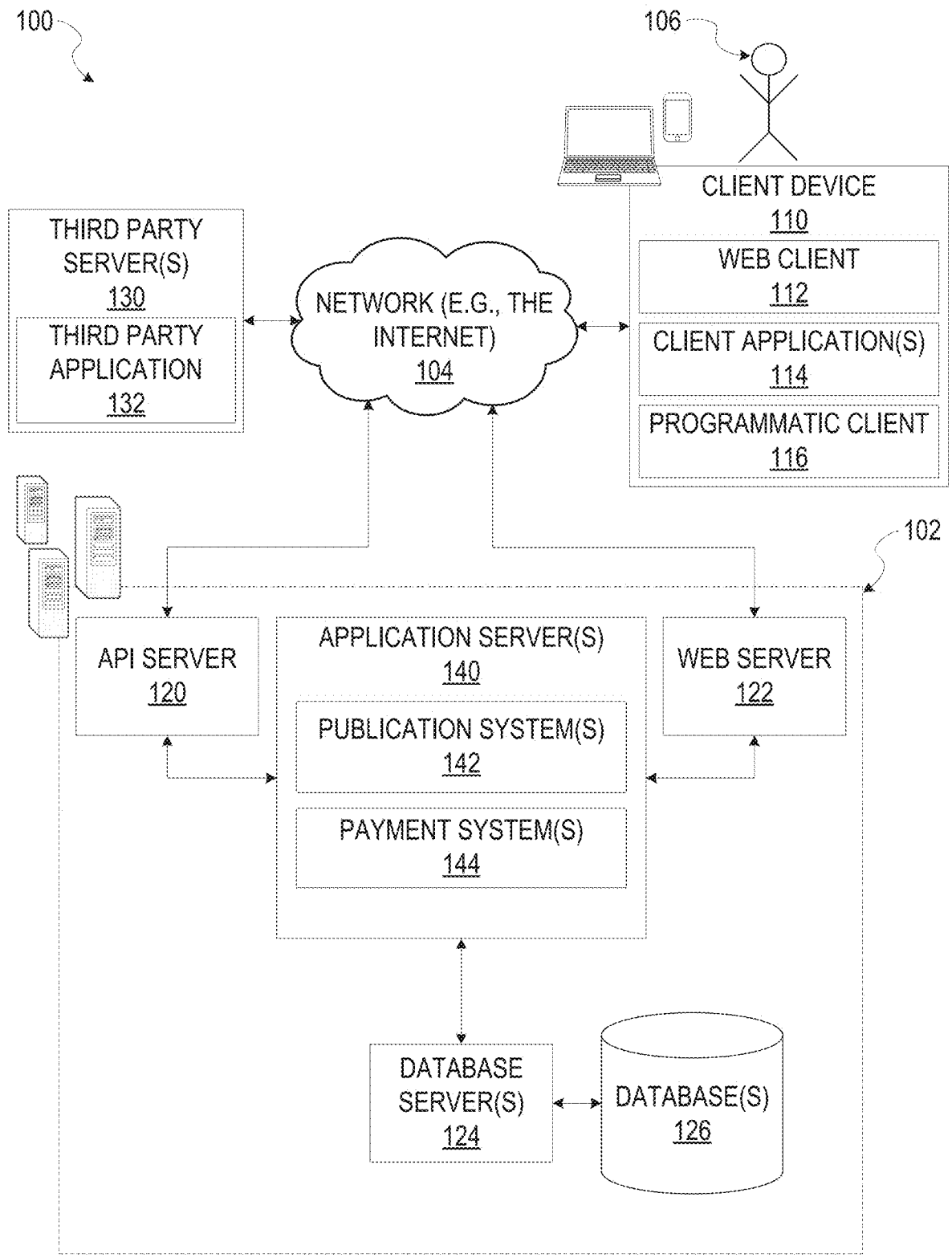
FIG. 1 is a block diagram illustrating an example embodiment of a network architecture of a system used to provide a multi-currency cart and checkout system.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for managing a multi-currency cart and checkout process. Example embodiments provide a single cart and seamless checkout process that is capable of handling multiple currencies. In example embodiments, a currency accepted for each item in a multi-currency cart is identified. The accepted currency may be identified by accessing a listing from a networked marketplace for each item and parsing the listing to detect the accepted currency for each item. Alternatively, the accepted currency may be identified by accessing metadata stored for each item in the multi-currency cart. In some embodiments, more than one currency is accepted for an item.

Similarly, a payment option for each item in the multi-currency cart is identified. The payment option may be identified by accessing the listing from the networked marketplace for each item and parsing the listing to detect the payment option for each item. Alternatively, the payment option may be identified by accessing metadata stored for each item in the multi-currency cart. In some instances, more than one payment option is available for an item.

A plurality of currency groups is generated based on the currency and payment options, whereby each currency group comprises one or more items having a same payment option (e.g., same payment method) and accepting a same currency. A multi-currency checkout user interface (UI) is caused to be presented on a client device that presents the plurality of currency groups and a pay selector for each of the plurality of the currency groups. A selection of the pay selector for one of the plurality of currency groups is received. In response, a group checkout user interface (UI) is caused to be presented. The group checkout UI presents shipping options along with one or more payment options from which a user may select. Once the shipping options and payment option is selected and a trigger received to process payment, a payment system processes the payment. Subsequently, an updated multi-currency checkout UI is cause to be presented in response to processing payment for the selected one of the plurality of currency groups. The updated multi-currency UI presents a confirmation for payment for the selected one of the plurality of currency groups and presents remaining currency groups of the plurality of currency groups from which the user may select a corresponding pay selector to initiate payment processing for a next currency group.

As a result, one or more of the methodologies described herein facilitate data processing in the form of cart management and payment processing. The user does not need to place items of a same currency into a cart and perform payment processing on the cart, and repeat the entire process again for items of a different currency being purchased. When these effects are considered in aggregate, one or more of the methodologies described herein may obviate a need for certain efforts or resources that otherwise would be involved in processing data. Computing resources used by one or more machines, databases, or devices (e.g., within the network environment) may be reduced. Examples of such computing resources include processor cycles, network traffic, memory usage, data storage capacity, power consumption, and cooling capacity.

With reference to FIG. 1, an example embodiment of a high-level client-server-based network environment 100 that provides an environment in which a multi-currency cart and checkout process may be implemented is shown. A networked system 102, in example forms of a network-based marketplace and payment system, provides server-side functionality via a communication network 104 (e.g., the Internet, wireless network, cellular network, or a Wide Area Network (WAN)) to one or more client devices 110. FIG. 1 illustrates, for example, a web client 112 operating via a browser (e.g., such as the Internet Explorer® browser developed by Microsoft® Corporation of Redmond, Washington State), and a programmatic client 116 executing on the client device 110.

The client device 110 may comprise, but is not limited to, a smartphone, tablet, laptop, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and Global Positioning System (GPS) device. The client device 110 may be a device of a user 106, which is used to trigger processing of information and perform a transaction involving items within the networked system 102.

In one embodiment, the networked system 102 includes or is linked to a network-based marketplace that manages digital goods, responds to requests for item listings, publishes publications comprising item listings of items available on the network-based marketplace, and manages payments for these marketplace transactions. The client device 110 may interface with the networked system 102 via a connection with the network 104. Depending on the form of the client device 110, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 104 may be a Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or another packet-switched data network. In yet another example, the connection to the network 104 may be a wired connection (e.g., an Ethernet link), and the network 104 may be a LAN, a WAN, the Internet, or another packet-switched data network. Accordingly, a variety of different configurations are expressly contemplated.

In various embodiments, the data exchanged within the network environment 100 may be dependent upon user-selected functions available through one or more client or user interfaces (UIs). The UIs are associated with a client device, such as the client device 110 executing the web client 112 (e.g., an Internet browser), which may be in communication with the networked system 102. The UIs may also be associated with one or more applications executing on the client device 110, such as a mobile application or operating system designed for interacting with the networked system 102 or with a third party application 132 hosted by a third party server 130.

The client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

Turning specifically to the networked system 102, an application program interface (API) server 120 and a web server 122 are coupled to, and provide programmatic and web interfaces respectively to, one or more application servers 140. The application server 140 hosts one or more publication systems 142 and payment systems 144, each of which may comprise one or more modules, applications, or engines, and which can be embodied as hardware, software, firmware, or any combination thereof. The application servers 140 are, in turn, coupled to one or more database servers 124 that facilitate access to one or more information storage repositories or databases 126. In one embodiment, the database 126 is a storage device that stores content (e.g., product listings, store information, advertisements, user accounts) that is used by the publication system 142.

In example embodiments, the publication system 142 publishes content on a network (e.g., Internet). As such, the publication system 142 provides a number of publication functions and services to the user 106 that access the networked system 102. For example, the publication system 142 can host a marketplace application that provides a number of marketplace functions and services to users, such as publishing, listing, and price-setting mechanisms whereby a seller may list (or publish information concerning) goods or services (also collectively referred to as "items") for sale, a buyer can express interest in or indicate a desire to purchase such goods or services, and a price can be set for a transaction pertaining to the goods or services. However, it is noted that the publication system 142 may, in alternative embodiments, be associated with a non-marketplace environment such as an informational (e.g., search engine) or social networking environment.

The payment system 144 may likewise provide a number of functions to perform or facilitate payments and transactions. The payment system 144 will be discussed in more detail in connection with FIG. 2.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

FIG. 1 also illustrates the third party application 132 executing on the third party server 130 that can exchange information with the application server 140 or with the client device 110. The third party application 132 may have programmatic access to the networked system 102 via a programmatic interface provided by the API server 120. The third party application 132 is associated with any organization that conducts transactions with, or provides services to, the application server 140 or to the user 106 of the client device 110.

While the publication system 142 and payment system 144 are shown in FIG. 1 to form part of the networked system 102, it will be appreciated that, in alternative embodiments, the publication system 142 or payment system 144 may form part of a separate service that is distinct from the networked system 102. Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The publication system 142 and payment system 144 can also be implemented as standalone software programs, which do not necessarily have networking capabilities.

Figure 2:
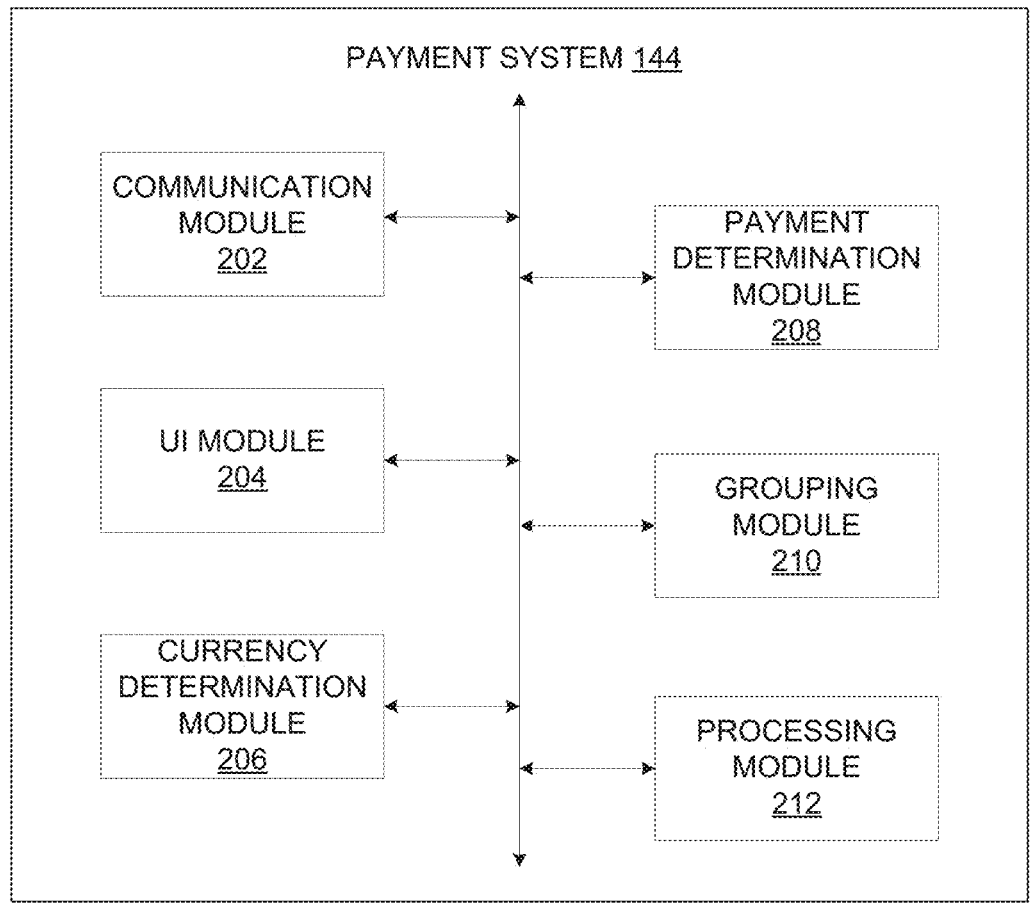
FIG. 2 is a block diagram illustrating an example embodiment of a payment system.

Referring now to FIG. 2, an example block diagram illustrating multiple components that, in one embodiment, are provided within the payment system 144 of the networked system 102 is shown. The payment system 144 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

In example embodiments, the payment system 144 manages the multi-currency cart and checkout process. To enable these operations, the payment system 144 comprises a communication module 202, a user interface (UI) module 204, a currency determination module 206, a payment determination module 208, a grouping module 210, and a processing module 212 all communicatively coupled to enable communication there between. In example embodiments, the user of the user device 110 has selected items from the network-based marketplace. The selected items comprise items from sellers that require payment in different currencies. Accordingly, a multi-currency cart and checkout process is utilized.

The communication module 202 manages exchange of communications for the payment system 144. In example embodiments, the communication module 202 transmits user interfaces (UI) or instructions to generate UIs to the client device 110. Additionally, the communication module 202 receives data from the client device 110. The data may include, for example, selection of currency groups, pay triggers, payment selections, and shipping selections.

The UI module 204 generates various UIs that are displayed on the client device 110 and updates these UIs based on selections and processes performed based on the selections. The UIs include, for example, a multi-currency cart, a multi-currency checkout UI, and a group checkout UI.

The currency determination module 206 determines one or more currencies associated with each item in the multi-currency cart. In example embodiments, the currency determination module 206 retrieves or examines an item listing for each item in the multi-currency cart. The item listing comprises various information for the item including, for example, price, description, shipping options, and payment options. The currency determination module 206 may parse the information in the item listing to determine a currency that is accepted for the item. Alternatively, the currency may be based on a location of the seller (e.g., identified from the item listing or from a profile of the seller). In other embodiments, the currency may be tagged when the item listing was created and the currency determination module 206 accesses the tag (e.g., metadata) to determine the accepted currency.

The payment determination module 208 determines one or more payment options associated with each item in the multi-currency cart. In example embodiments, the payment determination module 208 retrieves or examines the item listing for each item in the multi-currency cart. The payment determination module 208 may parse the information in the item listing to determine payment options that are accepted for the item. In other embodiments, the payment options may be tagged when the item listing was created and the payment determination module 208 accesses the tag (e.g., metadata) to determine the payment options.

The grouping module 210 groups items having the same currency and payment options into currency groups. Accordingly, the grouping module 210 analyzes the various currency and payment options determined by the currency determination module 206 and the payment determination module 208 to generate the currency groups. In embodiments where more than one currency or payment option is accepted for items in the multi-currency cart, the grouping module 210 may attempt to group the items such that a smallest number of currency groups are created.

The processing module 212 manages the payment processing at the payment system 144. In some embodiments, the processing module 212 causes funds to be debit from an account of the user and credited to an account of a seller for each item. In other embodiments, the processing module 212 may facilitate a payment with one or more third party financial entities (e.g., bank, credit card company). In example embodiments, the processing module 212 also manages the use of coupons, gift cards or certificates, and loyalty incentives.

Although the various components of the payment system 144 have been defined in terms of a variety of individual modules, a skilled artisan will recognize that many of the items can be combined or organized in other ways and that not all modules or engines need to be present or implemented in accordance with example embodiments. Furthermore, not all components of the payment system 144 have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 3A:
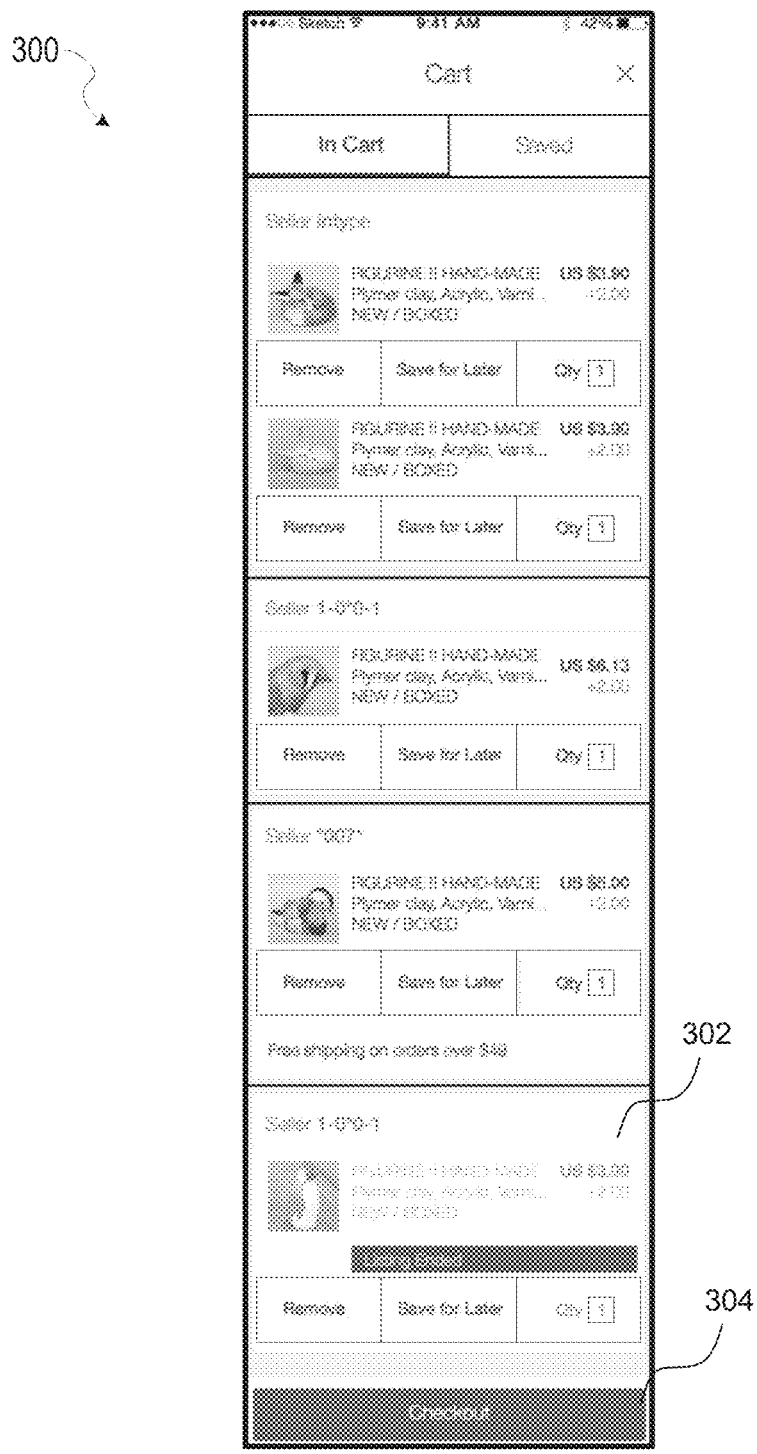
FIG. 3A-3H are example user interfaces presented on a client device that illustrates use of a multi-currency cart and checkout system.

3A-3H are example user interfaces presented on the client device 110 that illustrates use of the multi-currency cart and multi-currency checkout process. Referring to FIG. 3A, an example of a multi-currency cart 300 is shown. In example embodiments, the user of the user device 110 has selected items from the network-based marketplace. The selected items comprise items from sellers that require payment in different currencies. As shown, four items are presented in the multi-currency cart 300 for which a checkout process may be performed. A fifth item 302 is for an item listing that has since expired. As a result, the user can no longer purchase this item, and the fifth item 402 may be shown grayed-out.

FIG. 3A shows the four items with prices in US dollars. This may be the case because the user primarily deals in US dollars (e.g., lives in the US; has a US dollar payment instrument linked to the payment system 144). For items that require payment in a foreign currency (e.g., non-US dollars), the amount may be based on a conversion from the foreign currency to US dollars. In alternative embodiments, the foreign currency may be shown along with, or instead of, a US dollar amount.

Further still, the user can perform operations on each item in the multi-currency cart. For example, the user can elect to remove an item from the multi-currency cart 300 or save an item for later purchase. Additionally, the user can change a quantity of an item (if available from the seller).

Figure 3B:
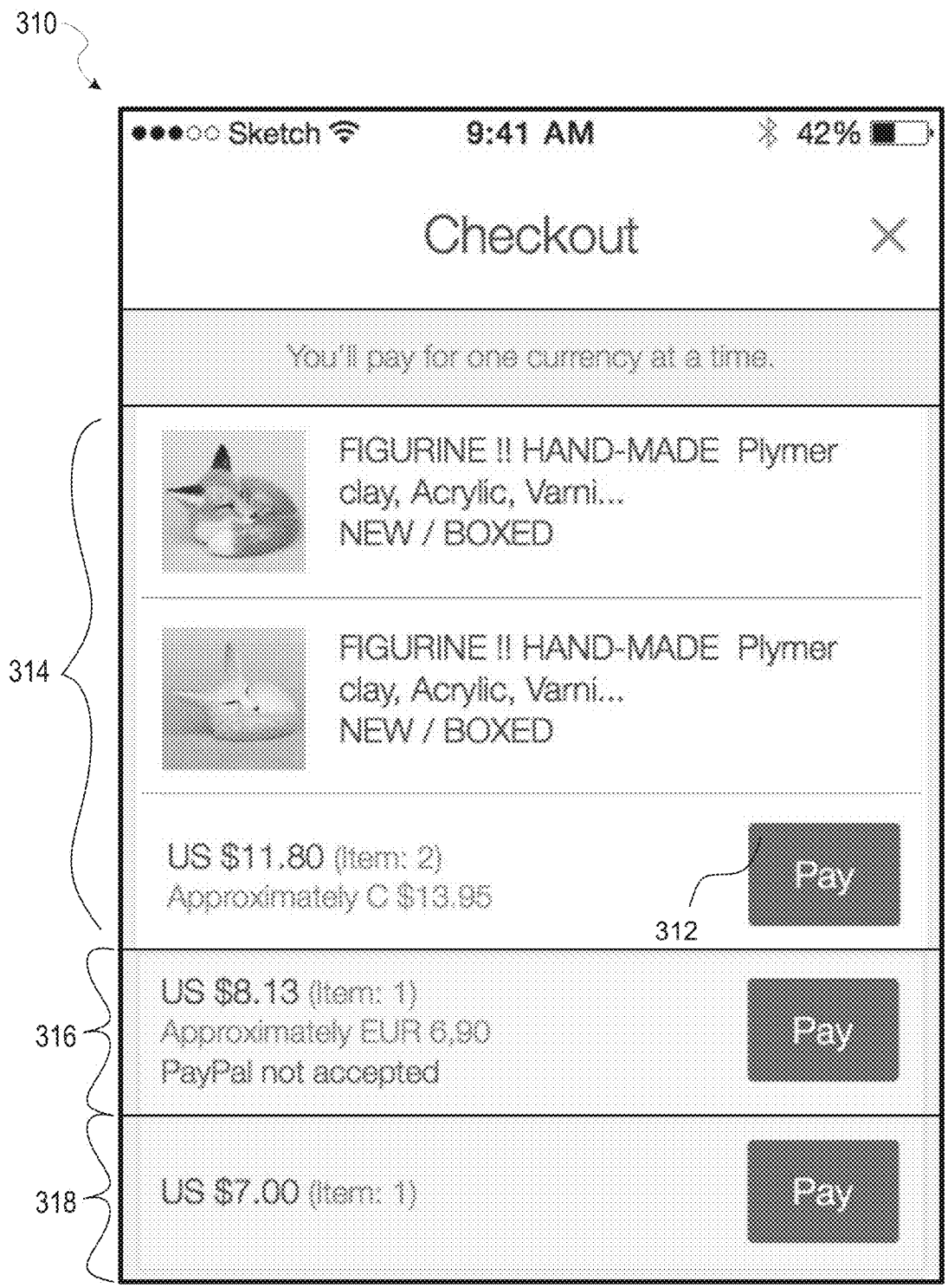

Upon a selection of a checkout selector 304, a multi-currency checkout user interface (UI) 310, as shown in FIG. 3B, is presented on the user device 110. In one embodiment, the multi-currency checkout UI 310 presents different currency groups and an amount in the user's primary currency for each currency group. The multi-currency checkout UI 310 also provides a pay selector 312 for each currency group.

The user may view, in more detail, the different currency groups by, for example, clicking (e.g., with a mouse) or touching (e.g., on a touchscreen) a location within the currency group other than the pay selector 312 corresponding to the currency group. For example, the user has selected a first currency group 314 in FIG. 3B by clicking on any area of the first currency group 314 other than the pay selector 312. Based on the selection, the first currency group 314 is expanded out to show details of the items within the first currency group 314. The details include, for example, a name or title of the item and description of the item. A total for each of the currency groups is also presented (e.g., in the user's primary currency). In one embodiment, the first currency group 314 (e.g., a currency group at a top of the multi-currency checkout UI 310) is automatically expanded when the user selects the checkout selector 304 of FIG. 3A.

Figure 3C:
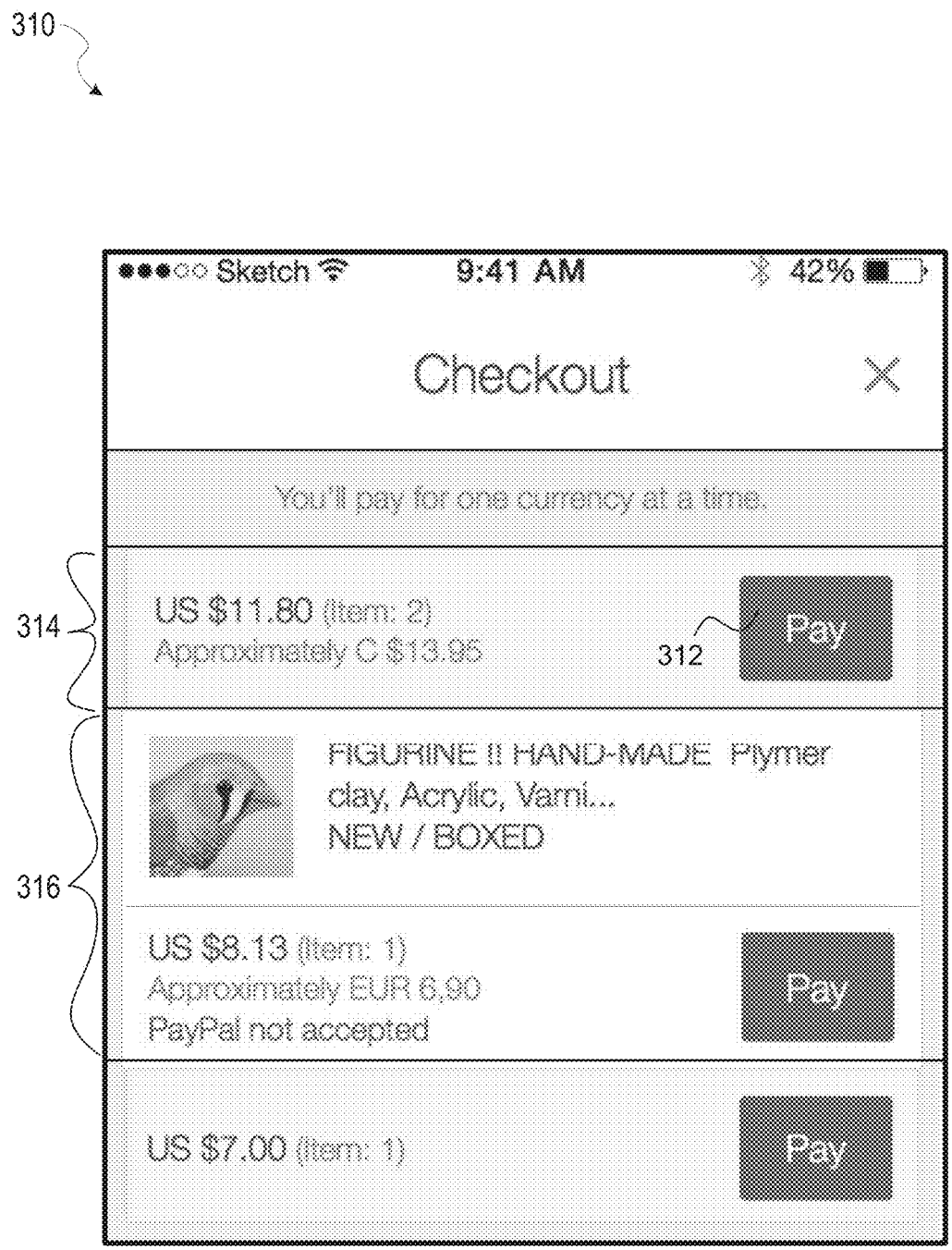

The user can select to view the second currency group 316 by selecting or tapping on any area corresponding to the second currency group 316 except for the pay selector 312 corresponding to the second currency group 316. In response to the selection, the second currency group 316 is expanded to show more details as shown in FIG. 3C. Accordingly, the first currency group 314 is collapsed to show, for example, the amount of the first currency group 314 without any item details. In the case of the second currency group 316, an indication is presented that the second currency group 316 does not accept a particular payment option (e.g., does not accept PayPal). Similarly, the user can select to view details of a third currency group 318. Any number of currency groups may be provided on the multi-currency checkout UI 310.

Figure 3D:

Assuming the user selects to pay for the first currency group 314 (e.g., selection of the pay selector 312), a group checkout user interface (UI) 320 for the selected currency group is presented, as shown in FIG. 3D. In example embodiments, the group checkout UI 320 removes non-selected currency groups (e.g., the second currency group 316 and the third currency group 318 of FIG. 3C) and expands out the selected currency group (e.g., the first currency group 314) to show additional information including various options such as shipping options, in-store pickup options, and payment options.

In example embodiments, one or more shipping options 322 are presented for each item in the selected currency group. Each shipping option 322 includes a shipping fee for delivery. In some cases, the different shipping options may be based on speed of delivery. For example, a user may be willing to pay more for expedited delivery. Further still, different shipping couriers may be provided from which the user may select to user to ship the item.

In embodiments where the item is available locally to the user, an in-store pickup option 324 is selectable on the group checkout UI 320. The location of the user may be determined based on information stored in a user account of the user (e.g., address) or based on a current location of the user (e.g., GPS on the client device 110). In some cases, more than one store may have the item available. In these cases, a list of stores may be presented to the user from which the user may select. Based on a selection of in-store pickup, a communication may be sent by the communication module 202 to the selected store to inform the store to prepare the item for pick-up. It is noted that different shipping selections may be received for the items within the currency group. For example, a first item may be shipped to the user, while a second item may be pick-up in a store.

In some embodiments, one or more payment options are presented for the currency group. For example, the user may select to pay using PayPal, a gift card, credit card, points, credit, coupons, or upon delivery. In some embodiments, more than one payment selection may be used. For example, the user may be allowed to use a gift card and PayPal, whereby payment is first processed against the gift card with a remaining balance paid via PayPal. In some embodiments, the amount charged to the user is in the primary currency of the user with the payment system 144 (e.g., the processing module 212) converting the primary currency into the currency required by the seller(s) of the items in the currency group. In other embodiments, the amount charged to the user is the primary currency of the seller(s). The currency used to charge the user may be based on user preferences, financial instrument/institution preferences (e.g., preference of bank or credit card used to pay), or currency type.

Once the user has made selections for the shipping/pickup options and payment option(s), the user triggers the processing of the payment by selecting the "place order" selector 326. The trigger is transmitted over the network 104 and received by the communication module 202 of the payment system 144. The processing module 212 processes the payment according to the selected payment option(s).

Figure 3E:
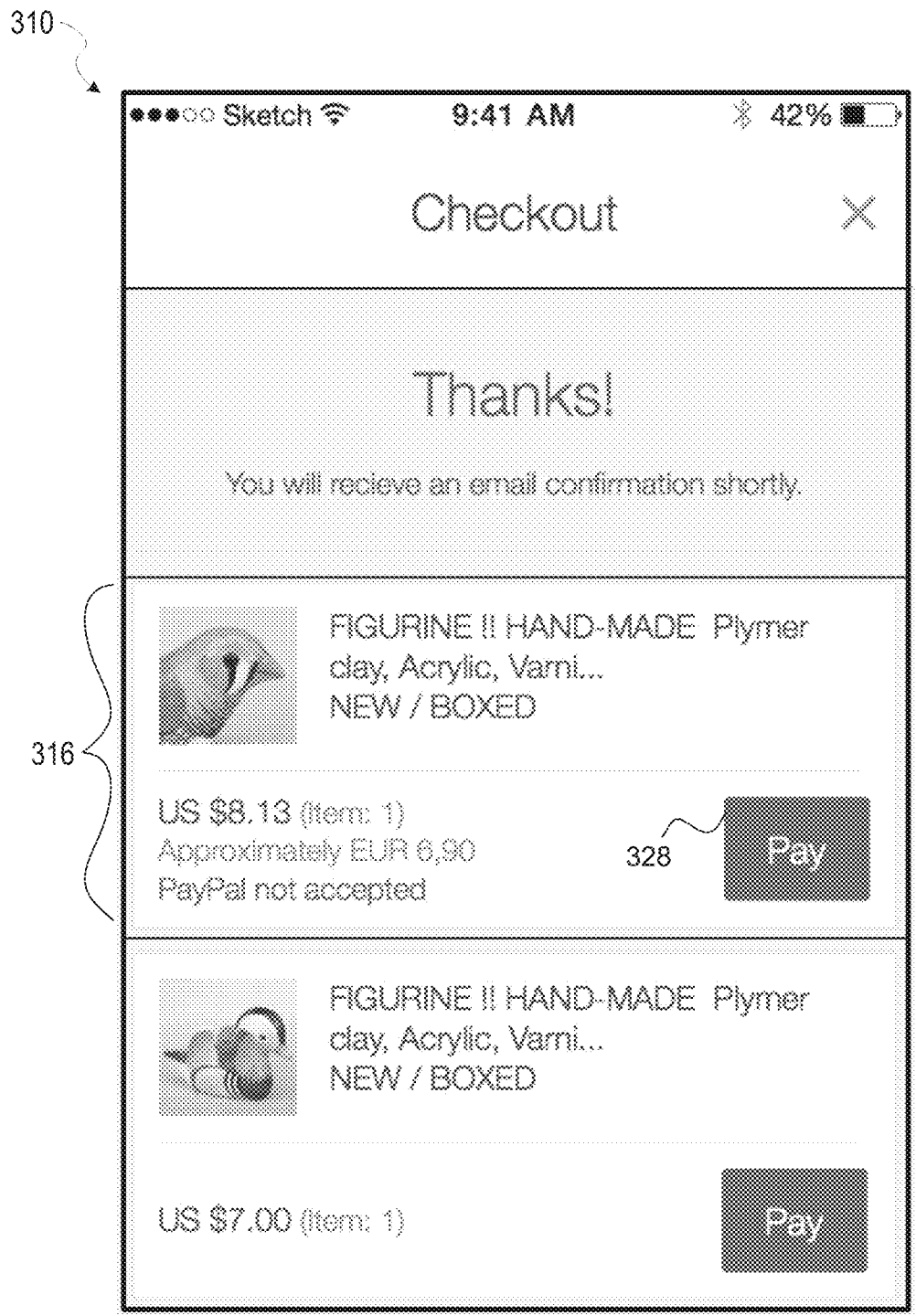

Upon completion of the payment processing, a confirmation is presented to the user. An example of the confirmation is shown in FIG. 3E. In particular, the multi-currency checkout UI 310 has been updated to present the confirmation in an area where the first currency group was previously shown. Furthermore, a next currency group (e.g., the second currency group 316) is expanded out to show details of the items within the first currency group 316. As such, the user continues the checkout process without having to create a new cart or log into the payment system 144 again.

Figure 3F:
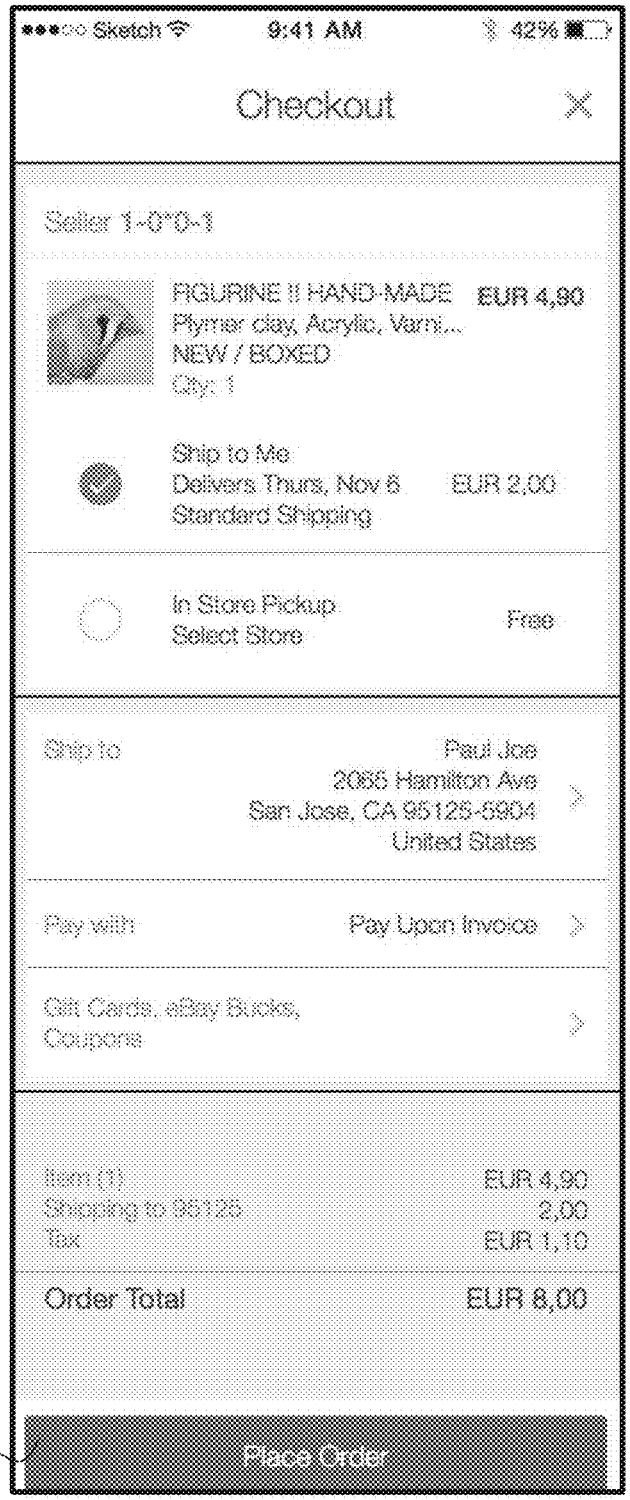

The user triggers payment for the second currency group 316 by selecting a pay selector 328. In response, a group checkout UI 330 for the second currency group 316 is presented, as shown in FIG. 3F. As with the group check UI 320 for the first currency group 314, the group checkout UI 330 for the second currency group 316 removes remaining non-selected currency groups (e.g., the third currency group 318) and expands out the second currency group 316 to show additional information including shipping options, in-store pickup options, and payment options.

Once the user has made selections for the shipping/pickup options and payment option(s), the user triggers the processing of the payment by selecting the "place order" selector 332, The trigger is transmitted over the network 104 and received by the communication module 202 of the payment system 144. The processing module 212 processes the payment according to the selected payment option(s). The second currency group 316 involves payment in Euros. As a result, the payment processing is performed with Euros. Subsequently, the payment system 144 (e.g., the processing module 212) may convert the amount from Euros to the primary currency of the user.

Figure 3G:
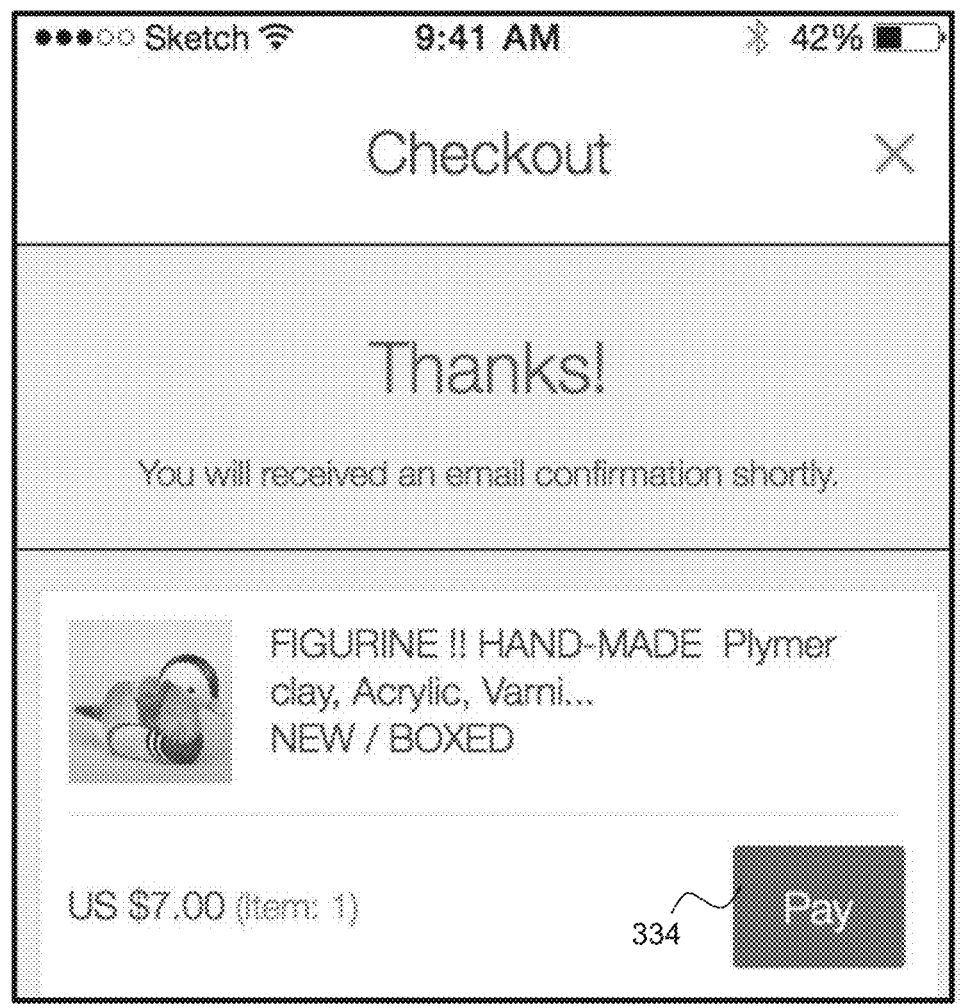

Upon completion of the payment processing, a confirmation is presented to the user, for example, as shown in FIG. 3G. The multi-currency checkout UI 310 is updated again to present the confirmation in an area where the second currency group 316 was previously shown. Furthermore, a next currency group (e.g., the third currency group 318), if one still remains, is expanded out to show details of the items within the next currency group. As such, the user continues the checkout process for the next currency group.

The user may trigger payment for the third currency group 318 by selecting a pay selector 334. Alternatively, the user may decide to delay paying for the third currency group 318 (e.g., the user may be unsure about purchasing the item or may want to add additional items in the same currency).

Figure 3H:
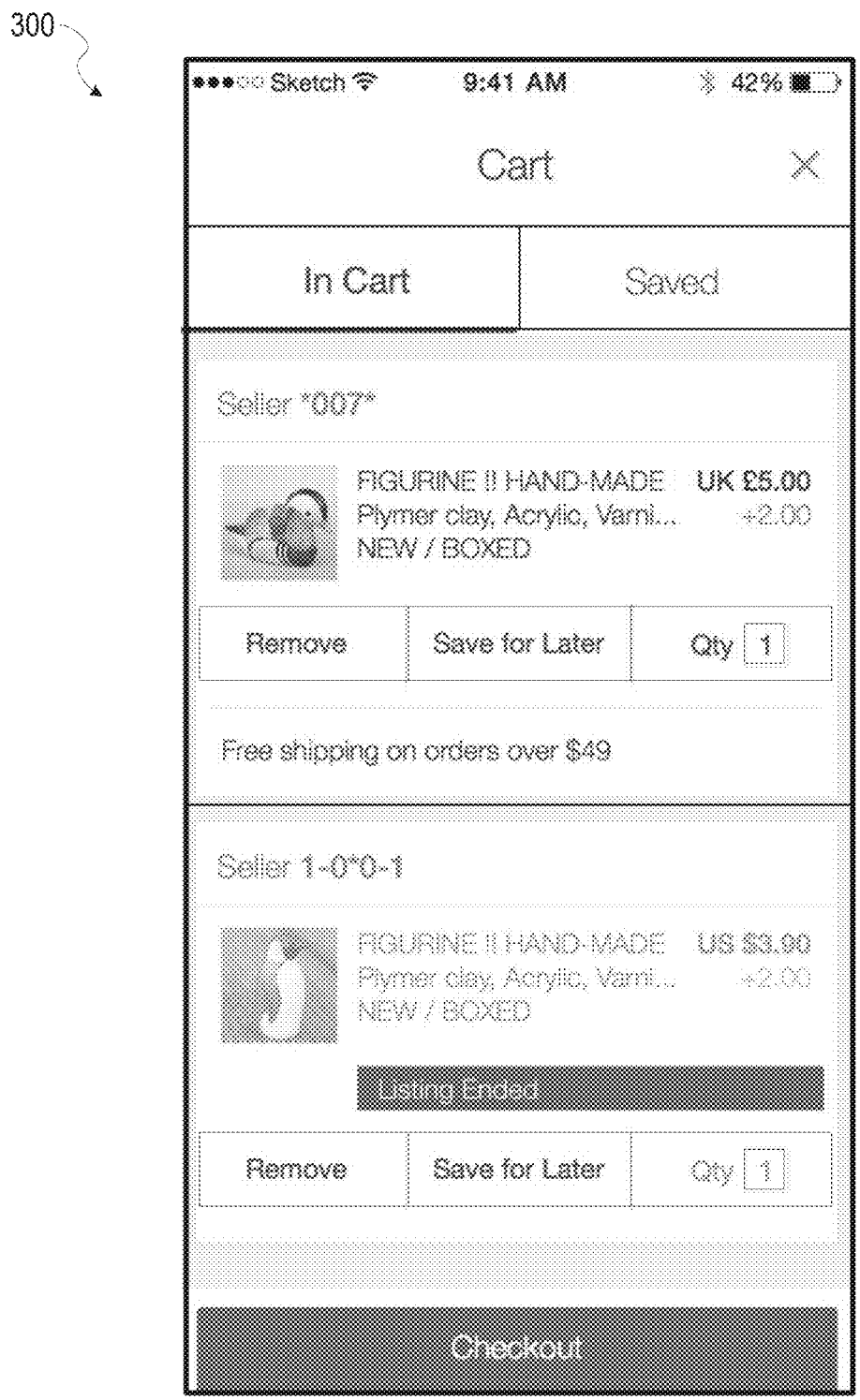

In one embodiment, the user may view what is remaining in the multi-currency cart 300, as shown in FIG. 3H. In one embodiment, the user returns to the multi-currency cart 300 by selecting to continue shopping after the payment of a currency group. In another embodiment, the user may select a cart icon that is presented, for example, on the multi-currency checkout UI after payment is processed. Further still, the user may select the cart icon displayed on any UI presented to the user at any time.

Figure 4:
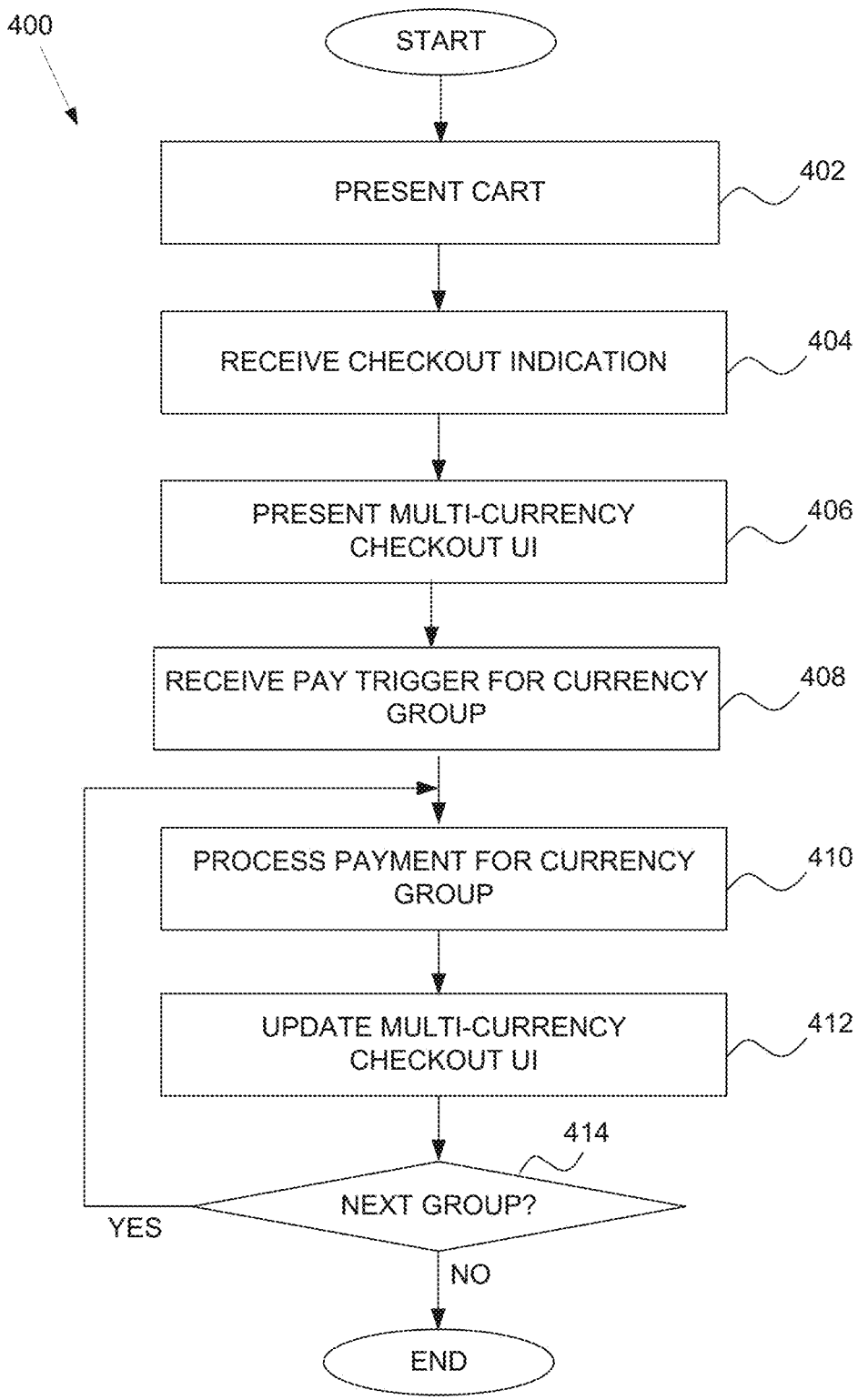
FIG. 4 is a flow diagram of an example method for managing a multi-currency cart and checkout.

FIG. 4 is a flow diagram of an example method 400 for managing a multi-currency cart and checkout process. In operation 402, a multi-currency cart is caused to be presented to the user. For example, instructions for displaying the multi-currency cart are generated by the UI module 204 and transmitted by the communication module 202 to the client device 110 to cause the client device 110 to present a UI that displays the multi-currency cart. Operation 402 will be discussed in more detail in connection with FIG. 5.

In operation 404, a checkout indication is received. Accordingly, the user may select a "checkout" selector displayed on the user interface in connection with the multi-currency cart. The selection of the "checkout" selector is transmitted over the network 104 to the payment system 144 and received by the communication module 202.

In operation 406, a multi-currency checkout user interface (UI) is caused to be presented to the user. For example, instructions for displaying the multi-currency checkout UI are generated by the UI module 204 and transmitted by the communication module 202 to the client device 110 to cause the client device 110 to present the multi-currency checkout UI. The multicurrency checkout UI presents the different currency groups formulated from the multi-currency cart and provides a "pay" selector for each currency group. The user may view more information for each of the different currency groups by, for example, clicking (e.g., with a mouse) or touching (e.g., on a touchscreen) a location within the currency group other than the "pay" selector as discussed in connection with FIGS. 3B and 3C above.

In operation 408, a pay trigger is received for one of the currency groups displayed in the multi-currency checkout UI. For example, the user may select the "pay" selector to pay for a currency group in US dollars that accepts PayPal. The selection of this currency group is transmitted over the network 104 to the payment system 144 and received by the communication module 202.

In response to the receipt of the pay trigger in operation 408, a payment for the selected currency group is processed in operation 410. Operation 410 will be discussed in more detail in connection with FIG. 6.

Once the payment is processed for the selected currency group, an updated multi-currency checkout UI is caused to be presented in operation 412. In example embodiments, the UI module 204 generates the updated multi-currency checkout UI (or instructions for presenting the updated multi-currency checkout UI at the client device 110) that removes the selected currency group for which the payment has been processed. As a result, only remaining currency groups where payment has not been processed are automatically presented in the updated multi-currency checkout UI. In example embodiments, the updated multi-currency checkout UI provides a confirmation that payment has been processed for the selected currency group.

In operation 414, a determination is made as to whether a pay trigger is received for a next currency group. If the pay trigger is received, then the method 400 returns to operation 410 and payment is processed for the next currency group. If no further pay triggers are received in operation 414, then the method 400 end.

Figure 5:
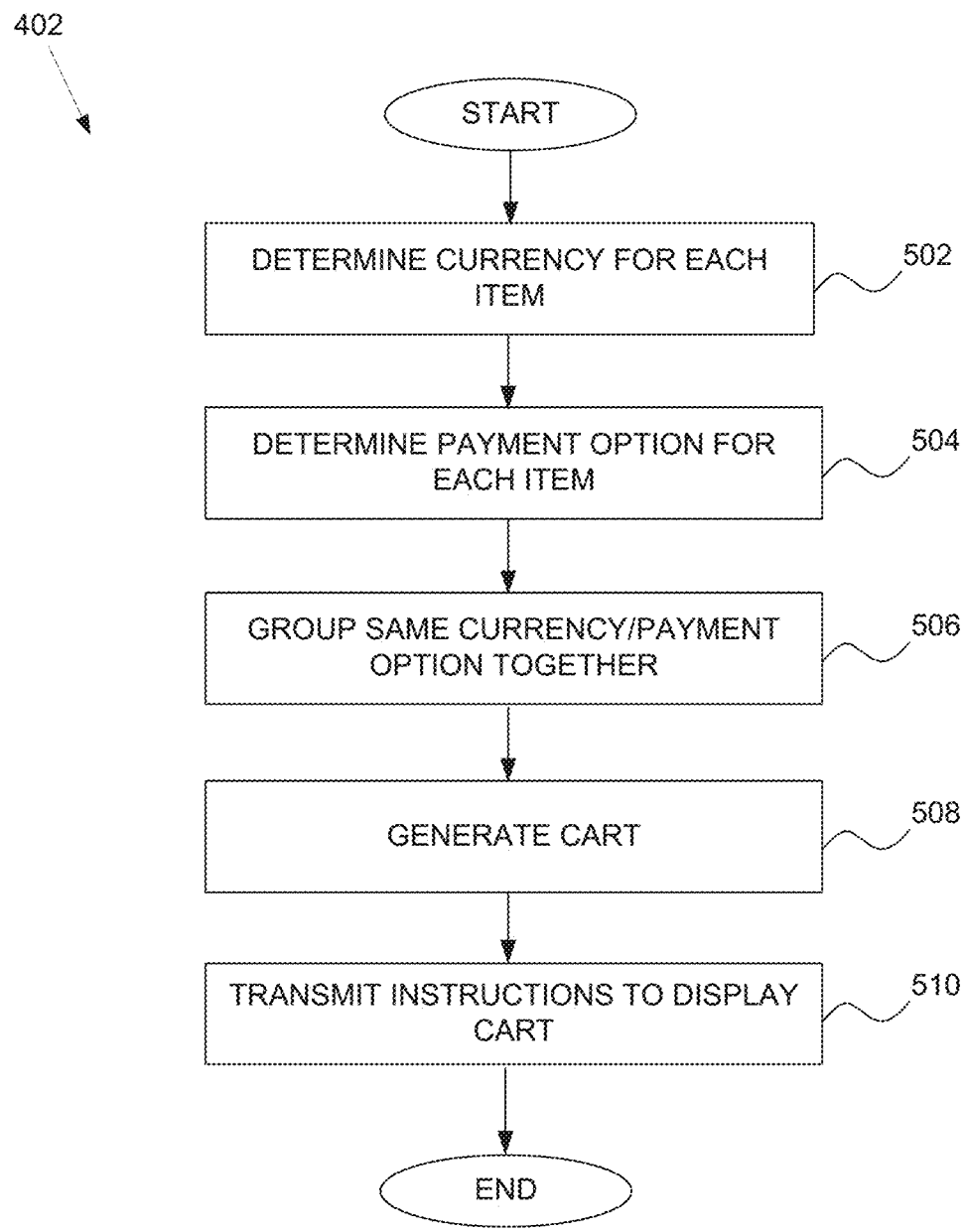
FIG. 5 is a flow diagram of an example method for presenting the multi-currency cart.

FIG. 5 is a flow diagram of an example method (operation 402) for presenting the multi-currency cart. In operation 502, an accepted currency is determined for each item placed into the multi-currency cart. In example embodiments, the currency determination module 206 examines or parses an item listing for each item in the multi-currency cart to identify the currency that is accepted for each item.

In operation 504, one or more payment options are determined for each item placed into the multi-currency cart. Accordingly, the payment determination module 208 examines or parses the item listing for each item in the multi-currency cart to identify the payment options available for each item. In some embodiments, more than one payment option is available for an item.

In operation 506, items with the same currency and payment options are grouped together to form currency groups. In example embodiments, the grouping module 210 takes the determinations made in operation 502 and 504 and groups the items accordingly. In embodiments where an item has more than one payment option, the grouping module 210 may select a payment option that is most common in which to group the item. Alternatively, the item may be grouped into multiple groups.

In operation 508, the multi-currency cart is generated. In example embodiments, the UI module 204 generates the multi-currency cart (or generates the instructions to create the cart).

In operation 510, instructions to display the multi-currency cart are transmitted to the client device 110 of the user. The communication module 202 transmits the instructions to the client device 110 via the network 104.

Figure 6:
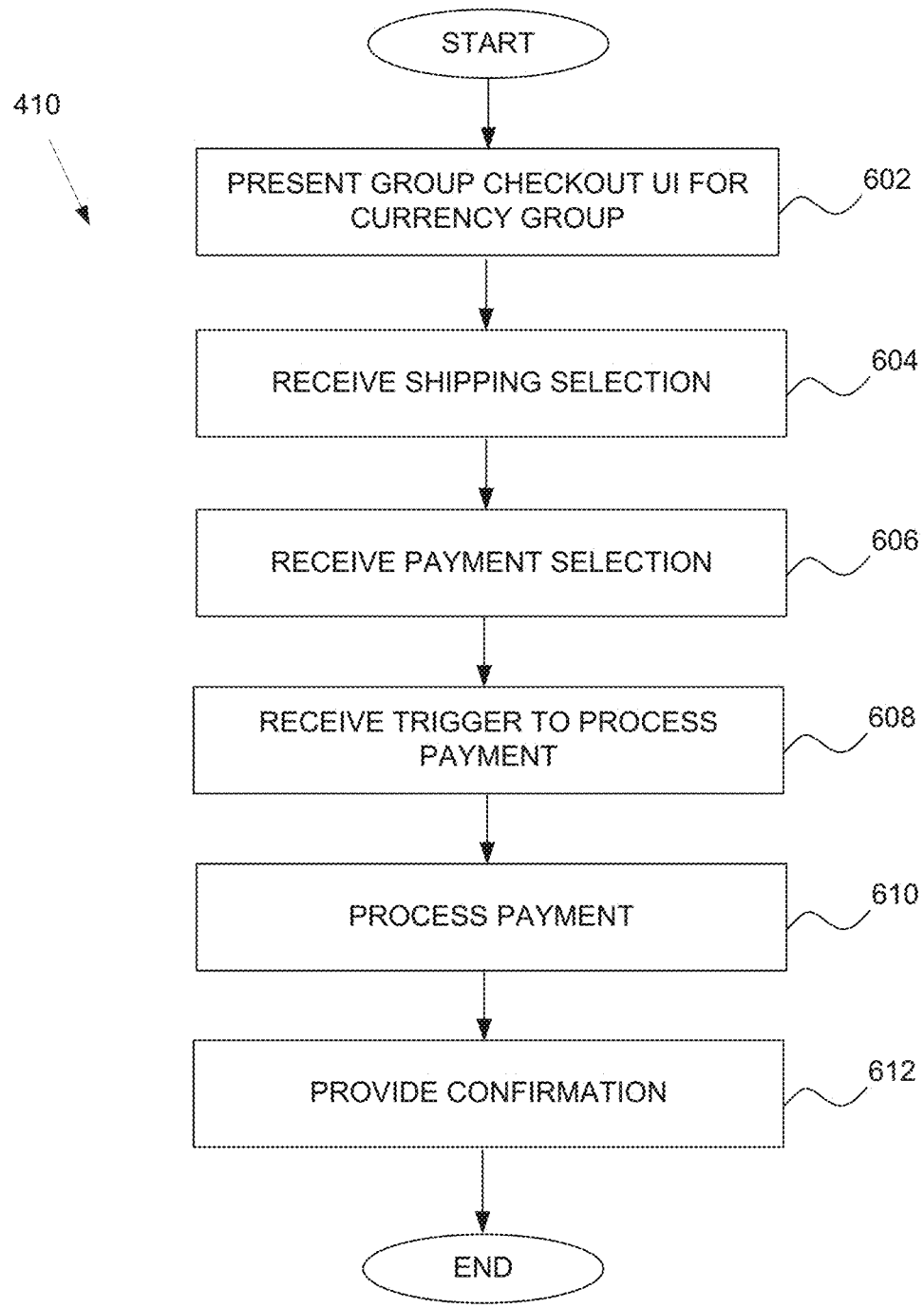
FIG. 6 is a flow diagram of an example method for processing payment for a currency group.

FIG. 6 is a flow diagram of an example method (operation 408) for processing payment for the selected currency group. In operation 602, a group checkout user interface (UI) is caused to be presented. The group checkout UI removes non-selected currency groups and expands out the selected currency group to show more details. In example embodiments, one or more shipping option are presented for each item in the selected currency group and one or more payment options are presented for the currency group. An example of a group checkout UI is shown in FIG. 3D.

In operation 604, a shipping selection is received for each item. It is noted that different shipping selections may be received for the items within the currency group. For example, a first item may be shipped to the user, while a second item may be pick-up in a store. Further still, different shipping couriers may be provided from which the user may select to user to ship the item. In embodiments where the user selects to pick up the item, the user may be presented with different stores from which to select for pick up.

In operation 606, a payment selection is received. For example, the user may select to pay using PayPal, a gift card, credit card, points, credit, coupons, or upon delivery. In some embodiments, more than one payment selection may be used. For example, the user may be allowed to use a gift card and PayPal, whereby payment is first processed against the gift card with a remaining balance paid via PayPal. In embodiments where there is only one payment option available, operation 606 is optional or not performed.

In operation 608, a trigger to process payment is received. Once all the selections are made, the user selects a trigger to process payment. For example, the user may select a "place order" selector. The trigger is transmitted over the network 104 to the communication module 202 of the payment system 144.

In operation 610, payment is processed according to the payment selection(s). Accordingly, the processing module 212 processes the payment. In some embodiments, the processing module 212 causes funds to be debit from an account of the user and credited to an account of a seller for each item. In other embodiments, the processing module 212 may facilitate a payment with one or more third party financial entity (e.g., bank, credit card company). Further still, the processing module 212 may cause conversion of the currency from the primary currency of the user to the accepted currency of a seller.

In operation 612, confirmation regarding completion of the payment processing is provided. For example, the UI module 204 causes presentation of a confirmation on the client device 110. Alternatively or additionally, the processing module 212 generates a confirmation message (e.g., e-mail, text message) that is transmitted to the user. The confirmation may be presented in an area of the multi-currency checkout UI where the currency group for which payment is processed was originally displayed.

Figure 7:
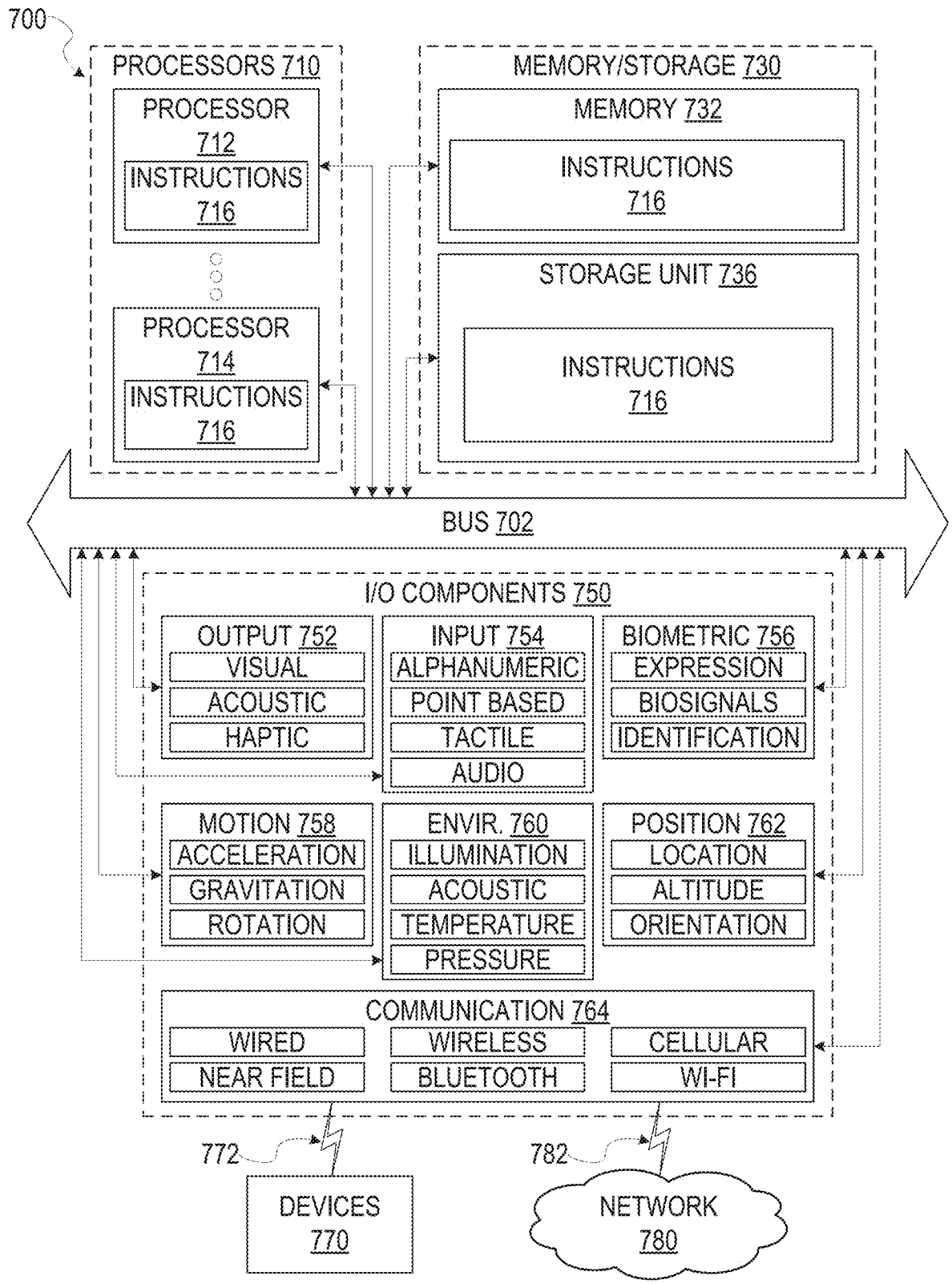
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions 716 from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system (e.g., a computer) within which the instructions 716 (e.g., software, a program, an application, an applet, an app, or other executable code) for causing the machine 700 to perform any one or more of the methodologies discussed herein may be executed, in whole or in part.

For example the instructions may cause the machine 700 to execute the flow diagrams of FIGS. 4-6. Additionally, or alternatively, the instructions may implement the modules of FIG. 2. The instructions transform the general, non-programmed machine into a particular machine (e.g., specially configured machine) programmed to carry out the described and illustrated functions in the manner described.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, smart device, mobile, device, a web appliance, a network router, a network switch, a network bridge, or any machine capable of executing the instructions 716, sequentially or otherwise, that specify actions to be taken by that machine 700. Further, while only a single machine is illustrated, the term "machine" shall also be taken to include a collection of machines that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core process), multiple processors with a single core, multiple processors with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the processors 710 are examples of machine-readable media.

As used herein, "machine-readable medium" means a device or component able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. While the machine-readable medium 722 is shown in an example embodiment to be a single medium, the term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the machine-readable medium as "non-transitory" should not be construed to mean that the medium is incapable of movement—the machine-readable medium should be considered as being transportable from one physical location to another. Additionally, since the machine-readable medium is tangible, the medium may be considered to be a machine-readable device.

The I/O components 750 may include a wide variety of components to receive input, provide output, produce output, transmit information, exchange information, capture measurements, and so forth. The specific I/O components 750 that are included in a particular machine will depend on the type of machine. For example, portable machines such as mobile phones will include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772, respectively. For example, the communication components 764 may include a network interface component or other suitable device to interface with the network 780. In further examples, communication components 764 may include wired communication components, wireless communication components, cellular communication components, Near Field. Communication (NFC) components, Bluetooth® components (e.g., Bluetooth® Low Energy), Wi-Fi® components, and other communication components to provide communication via other modalities.

The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    determining a currency accepted for each item of a plurality of items placed in a multi-currency cart;
    generating, by one or more hardware processors, a plurality of currency groups based on the currency accepted for each item of the plurality of items placed in the multi-currency cart by grouping one or more items having a same currency accepted together for each currency group; and causing presentation of a multi-currency checkout user interface (UI) on a client device, the multi-currency checkout UI presenting the plurality of currency groups generated from the multi-currency cart.

2. The method of claim 1, further comprising:

determining a payment option for each item of the plurality of items placed in the multi-currency cart, wherein generating the plurality of currency groups comprises grouping one or more items having the same payment option with the same currency accepted together for each currency group.

3. The method of claim 1, further comprising:

receiving a trigger to process payment for a selected currency group of the plurality of currency groups;

in response to receiving the trigger, processing payment for the selected currency group; and responsive to processing the payment, causing presentation of a confirmation for the payment.

4. The method of claim 3, further comprising:

causing presentation of an updated multi-currency checkout UI in response to completion of the processing payment for the selected currency group, the updated multi-currency UI comprising remaining currency groups of the plurality of currency groups awaiting payment processing.

5. The method of claim 3, wherein receiving the trigger to process payment for the selected currency group comprises:

receiving a selection of the selected currency group from the plurality of currency groups; and in response to receiving the selection of the selected currency group, causing presentation of a group checkout user interface (UI) for the selected currency group, the group checkout UI removing non-selected currency groups of the plurality of currency groups.

6. The method of claim 1, wherein determining the currency accepted comprises:

accessing a listing for each item; and parsing the listing to detect the currency accepted for each item.

7. The method of claim 1, wherein determining the currency accepted comprises:

accessing metadata associated with each item, the metadata indicating the currency accepted for each item.

8. The method of claim 1, wherein determining the currency accepted is based on a location of the seller.

9. The method of claim 1, further comprising:

receiving a selection of a currency group presented on the multi-currency checkout UI; and in response to the selection of the currency group, expanding out an area associated with the selected currency group to show details of one or more items within the selected currency group.

10. A system comprising:

one or more hardware processors; and a memory storing instructions that, when executed by the one or more hardware processors, cause the one or more hardware processors to perform operations comprising:

determining a currency accepted for each item of a plurality of items placed in a multi-currency cart;

generating a plurality of currency groups based on the currency accepted for each of the plurality of items placed in the multi-currency cart by grouping one or more items having a same currency accepted together for each currency group; and causing presentation of a multi-currency checkout user interface (UI) on a client device, the multi-currency checkout UI presenting the plurality of currency groups generated from the multi-currency cart.

11. The system of claim 10, wherein the operations further comprise:

determining a payment option for each item of the plurality of items placed in the multi-currency cart, wherein generating the plurality of currency groups comprises grouping one or more items having the same payment option with the same currency accepted together for each currency group.

12. The system of claim 10, wherein the operations further comprise:

receiving a trigger to process payment for a selected currency group of the plurality of currency groups;

in response to receiving the trigger, processing payment for the selected currency group; and responsive to processing the payment, causing presentation of a confirmation for the payment.

13. The system of claim 12, wherein the operations further comprise:

causing presentation of an updated multi-currency checkout UI in response to completion of the processing payment for the selected currency group, the updated multi-currency UI comprising remaining currency groups of the plurality of currency groups awaiting payment processing.

14. The system of claim 12, wherein receiving the trigger to process payment for the selected currency group comprises:

receiving a selection of the selected currency group from the plurality of currency groups; and in response to receiving the selection of the selected currency group, causing presentation of a group checkout user interface (UI) for the selected currency group, the group checkout UI removing non-selected currency groups of the plurality of currency groups.

15. The system of claim 10, wherein determining the currency accepted comprises:

accessing a listing for each item; and parsing the listing to detect the currency accepted for each item.

16. The system of claim 10, wherein determining the currency accepted comprises:

accessing metadata associated with each item, the metadata indicating the currency accepted for each item.

17. The system of claim 10, wherein determining the currency accepted is based on a location of the seller.

18. The system of claim 10, wherein the operations further comprise:

receiving a selection of a currency group presented on the multi-currency checkout UI; and in response to the selection of the currency group, expanding out an area associated with the selected currency group to show details of one or more items within the selected currency group.

19. A non-transitory machine-storage medium storing instructions which, when executed by one or more processors of a machine, cause the machine to perform operations comprising:

determining a currency accepted for each item of a plurality of items placed in a multi-currency cart;

generating a plurality of currency groups based on the currency accepted for each item of the plurality of items placed in the multi-currency cart by grouping one or more items having a same currency accepted together for each currency group; and causing presentation of a multi-currency checkout user interface (UI) on a client device, the multi-currency checkout UI presenting the plurality of currency groups generated from the multi-currency cart.

20. The non-transitory machine-storage medium of claim 19, wherein the operations further comprise:

receiving a selection of a currency group presented on the multi-currency checkout UI; and in response to the selection of the currency group, expanding out an area associated with the selected currency group to show details of one or more items within the selected currency group.

* * * * *